(12) United States Patent
Yu et al.

(10) Patent No.: US 11,488,511 B2
(45) Date of Patent: Nov. 1, 2022

(54) IMAGE PROCESSING METHOD, DRIVE DEVICE, DISPLAY PANEL AND WEARABLE DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Yong Yu, Beijing (CN); Yuan Yao, Beijing (CN); Chuanyan Lan, Beijing (CN); Taehyun Kim, Beijing (CN)

(73) Assignees: Chengdu BOE Optoelectronics Technology Co., Ltd., Sichuan (CN); Beijing BOE Technology Development Co., Ltd., Beijing (CN)

( * ) Notice: Subject to any disclaimer, the term of this patent is extended or adjusted under 35 U.S.C. 154(b) by 689 days.

(21) Appl. No.: 16/320,390

(22) PCT Filed: May 22, 2018

(86) PCT No.: PCT/CN2018/087734
§ 371 (c)(1),
(2) Date: Jan. 24, 2019

(87) PCT Pub. No.: WO2019/019782
PCT Pub. Date: Jan. 31, 2019

(65) Prior Publication Data
US 2021/0335189 A1 Oct. 28, 2021

(30) Foreign Application Priority Data
Jul. 28, 2017 (CN) .......................... 201710632881.2

(51) Int. Cl.
G09G 3/20 (2006.01)
G06F 1/16 (2006.01)
(Continued)

(52) U.S. Cl.
CPC ........... *G09G 3/2007* (2013.01); *G06F 1/163* (2013.01); *G06T 5/002* (2013.01); *G09G 3/3208* (2013.01);
(Continued)

(58) Field of Classification Search
None
See application file for complete search history.

(56) References Cited

U.S. PATENT DOCUMENTS

2013/0094717 A1 4/2013 Janni et al.
2015/0228058 A1 8/2015 Murahasi
(Continued)

FOREIGN PATENT DOCUMENTS

CN 104200427 A 12/2014
CN 104599625 A 5/2015
(Continued)

OTHER PUBLICATIONS

International Search Report and Written Opinion dated Aug. 22, 2018; PCT/CN2018/087734.
The Extended European Search Report dated Apr. 6, 2021; Appln. No. 18833378.5.

*Primary Examiner* — Christopher R Lamb

(57) ABSTRACT

An image processing method, a drive device, a display panel, and a wearable device are disclosed. The image processing method includes: determining an adjacent display pixel adjacent to each grayscale transition region in the row direction or in the column direction in the display image region according to a position of the grayscale transition region; determining a transition pixel in the grayscale transition region; acquiring a first pixel grayscale, in which the first pixel grayscale is a grayscale of the adjacent display pixel; acquiring a second pixel grayscale; adjusting a third pixel grayscale of the transition pixel according to the first pixel grayscale, the second pixel grayscale and the transition (Continued)

pixel, in which the third pixel grayscale is between the first pixel grayscale and the second pixel grayscale; and transmitting the third pixel grayscale to the display panel for display.

18 Claims, 7 Drawing Sheets

(51) Int. Cl.
    *G06T 5/00*         (2006.01)
    *G09G 3/3208*     (2016.01)

(52) U.S. Cl.
    CPC .............. *G06T 2207/20021* (2013.01); *G06T 2207/20192* (2013.01); *G09G 2310/0232* (2013.01); *G09G 2320/0271* (2013.01); *G09G 2340/14* (2013.01)

(56) References Cited

U.S. PATENT DOCUMENTS

| | | | |
|---|---|---|---|
| 2016/0379540 A1 | 12/2016 | Guo et al. | |
| 2018/0308413 A1* | 10/2018 | Jin | G09G 3/20 |
| 2018/0337217 A1* | 11/2018 | Zang | H01L 51/5281 |
| 2018/0357979 A1* | 12/2018 | Nakamura | G09G 5/10 |

FOREIGN PATENT DOCUMENTS

| | | | | |
|---|---|---|---|---|
| CN | 105511152 | * | 4/2016 | ....... G02F 1/133512 |
| CN | 105741774 A | | 7/2016 | |
| CN | 107450878 A | | 12/2017 | |
| EP | 1225558 A1 | | 7/2002 | |
| EP | 2293281 A1 | | 3/2011 | |
| WO | WO-2017110721 A1 | * | 6/2017 | ........... G09G 3/2003 |

* cited by examiner

IMAGE PROCESSING METHOD, DRIVE DEVICE, DISPLAY PANEL AND WEARABLE DEVICE

CROSS-REFERENCE TO RELATED APPLICATION

The present application claims priority of the Chinese Patent Application No. 201710632881.2, filed on Jul. 28, 2017, the disclosure of which is incorporated herein by reference in its entirety as part of the present application.

TECHNICAL FIELD

The embodiments of the present disclosure relate to an image processing method, a drive device, a display panel, and a wearable device.

BACKGROUND

Currently, mainstream display devices include liquid crystal display (LCD) panels or active-matrix organic light-emitting diode (AMOLED) display panels. Compared with the LCD panel, the AMOLED display panel has the advantages of rapider speed, higher contrast, wider viewing angle, lower power consumption, smaller module thickness, etc.

When the AMOLED is applied to a wearable product, the wearable product can be thinner and lightweight and portable in shape and specification. Therefore, currently, more and more wearable products adopt AMOLED as the display panel. However, most wearable products, e.g., smart watches, require a round display. When pixels arranged in an array are taken as a pixel array of a non-rectangular display such as a round display, due to problems such as real pixel arrangement, in an edge portion of the round display, for example, a severe sawtooth sense may occur at an intersection of the contours of the round display, resulting in poor viewing experience for customers.

Therefore, how to effectively reduce the problem of edge sawtooth that occurs when the non-rectangular display such as the round display is displayed in a display process is an urgent technical problem to be solved in this field.

SUMMARY

At least one embodiment of the present disclosure provides an image processing method of a display panel, the display panel comprises a display image region and a peripheral region; the peripheral region comprises grayscale transition regions; the grayscale transition regions are adjacent to the display image region; the display image region comprises a plurality of display pixels arranged along a row direction and a column direction; and the image processing method comprises: determining an adjacent display pixel adjacent to each grayscale transition region in the row direction or in the column direction in the display image region according to a position of the grayscale transition region; determining a transition pixel in the grayscale transition region; acquiring a first pixel grayscale, in which the first pixel grayscale is a grayscale of the adjacent display pixel; acquiring a second pixel grayscale; adjusting a third pixel grayscale of the transition pixel according to the first pixel grayscale, the second pixel grayscale and the transition pixel, in which the third pixel grayscale is between the first pixel grayscale and the second pixel grayscale; and transmitting the third pixel grayscale to the display panel for display.

For example, in the image processing method of the display panel provided by an embodiment of the present disclosure, the peripheral region further includes a background image region; the background image region includes a plurality of background pixels arranged along the row direction and the column direction; and acquiring the second pixel grayscale includes: determining an adjacent background pixel adjacent to the grayscale transition region in the row direction or in the column direction in the background image region, in which the second pixel grayscale is a grayscale of the adjacent background pixel.

For example, in the image processing method of the display panel provided by an embodiment of the present disclosure, an edge of the display image region includes a polygonal line segment formed by connection of line segments extending along the row direction and the column direction, the row direction and the column direction are perpendicular to each other; and determining the transition pixel in the grayscale transition region includes: forming a virtual rectangular area in the peripheral region by taking adjacent two line segments as adjacent two sides; and determining a quantity and an arrangement mode of transition pixels in the grayscale transition region according to the virtual rectangular area.

For example, in the image processing method of the display panel provided by an embodiment of the present disclosure, determining a quantity and an arrangement mode of transition pixels in the grayscale transition region according to the virtual rectangular area includes: when the virtual rectangular area includes one row and a plurality of columns of pixels, determining that the grayscale transition region includes a plurality of transition pixels disposed in the one row and adjacent to the display image region in the virtual rectangular area; when the virtual rectangular area includes a plurality of rows and one column of pixels, determining that the grayscale transition region includes a plurality of transition pixels disposed in the one column and adjacent to the display image region in the virtual rectangular area; and when the virtual rectangular area includes one row and one column of pixels, determining that the grayscale transition region includes one transition pixel adjacent to the display image region in the virtual rectangular area.

For example, in the image processing method of the display panel provided by an embodiment of the present disclosure, a shape of the display image region includes a non-rectangular shape.

For example, in the image processing method of the display panel provided by an embodiment of the present disclosure, the non-rectangular shape includes a round.

For example, in the image processing method of the display panel provided by an embodiment of the present disclosure, determining the adjacent display pixel adjacent to the grayscale transition region in the row direction or in the column direction in the display image region according to the position of the grayscale transition region includes: determining an extending direction of the grayscale transition region according to the position of the grayscale transition region; and determining the adjacent display pixel adjacent to the grayscale transition region in the display image region in the extending direction of the grayscale transition region.

For example, in the image processing method of the display panel provided by an embodiment of the present disclosure, a quantity of adjacent display pixels is at least one.

For example, in the image processing method of the display panel provided by an embodiment of the present disclosure, adjusting the third pixel grayscale of the transition pixel according to the position of the grayscale transition region, the first pixel grayscale of the adjacent display pixel, the second pixel grayscale, and the transition pixel includes: when the first pixel grayscale of the adjacent display pixel is greater than the second pixel grayscale, in the extending direction of the grayscale transition region, adjusting third pixel grayscales of transition pixels in the grayscale transition region to be gradually decreased in a direction from the display image region to the peripheral region; or when the first pixel grayscale of the adjacent display pixel is less than the second pixel grayscale, in the extending direction of the grayscale transition region, adjusting third pixel grayscales of transition pixels in the grayscale transition region to be gradually increased in a direction from the display image region to the peripheral region.

For example, in the image processing method of the display panel provided by an embodiment of the present disclosure, grayscale change step lengths of the third pixel grayscales of the transition pixels in the grayscale transition region are same.

At least one embodiment of the present disclosure further provides a drive device of a display panel, the display panel includes a display image region and a peripheral region; the peripheral region includes grayscale transition regions; the grayscale transition regions are adjacent to the display image region; the display image region includes a plurality of display pixels arranged along a row direction and a column direction; and the drive device comprises: a data acquisition circuit configured to acquire a first pixel grayscale and a second pixel grayscale; a memory configured to store a position of a grayscale transition region; and a processor configured to: determining an adjacent display pixel adjacent to the grayscale transition region in the row direction or in the column direction in the display image region according to the position of the grayscale transition region stored, the first pixel grayscale being a grayscale of the adjacent display pixel; determine a transition pixel in the grayscale transition region; and adjust a third pixel grayscale of the transition pixel according to the first pixel grayscale, the second pixel grayscale and the transition pixel, in which the third pixel grayscale is between the first pixel grayscale and the second pixel grayscale; and a data transmission circuit configured to transmit the third pixel grayscale to the display panel for display.

For example, in the drive device of the display panel provided by an embodiment of the present disclosure, the peripheral region further includes a background image region; the background image region includes a plurality of background pixels arranged along the row direction and the column direction; and the processor is also configured to determine an adjacent background pixel adjacent to the grayscale transition region in the row direction or in the column direction in the background image region according to the position of the grayscale transition region, in which the second pixel grayscale is a grayscale of the adjacent background pixel.

For example, in the drive device of the display panel provided by an embodiment of the present disclosure, an edge of the display image region includes a polygonal line segment formed by connection of line segments extending along the row direction and the column direction; the row direction and the column direction are perpendicular to each other, and a step of determining the transition pixel in the grayscale transition region, performed by the processor, includes: forming a virtual rectangular area in the peripheral region by taking adjacent two line segments as adjacent two sides; and determining a quantity and an arrangement mode of transition pixels in the grayscale transition region according to the virtual rectangular area.

For example, in the drive device of the display panel provided by an embodiment of the present disclosure, a step of determining the quantity and the arrangement mode of transition pixels in the grayscale transition region according to the virtual rectangular area, performed by the processor, includes: when the virtual rectangular area includes one row and a plurality of columns of pixels, determining that the grayscale transition region includes a plurality of transition pixels located in the one row and adjacent to the display image region in the virtual rectangular area; when the virtual rectangular area includes a plurality of rows and one column of pixels, determining that the grayscale transition region includes a plurality of transition pixels located in the one column and adjacent to the display image region in the virtual rectangular area; and when the virtual rectangular area includes one row and one column of pixels, determining that the grayscale transition region includes one transition pixel adjacent to the display image region in the virtual rectangular area.

For example, in the drive device of the display panel provided by an embodiment of the present disclosure, a shape of the display image region includes a non-rectangular shape.

For example, in the drive device of the display panel provided by an embodiment of the present disclosure, when the first pixel grayscale of the adjacent display pixel is greater than the second pixel grayscale, the processor is configured to: in the extending direction of the grayscale transition region, adjust third pixel grayscales of transition pixels in the grayscale transition region to be gradually decreased in a direction from the display image region to the peripheral region; or when the first pixel grayscale of the adjacent display pixel is less than the second pixel grayscale, the processor is configured to: in the extending direction of the grayscale transition region, adjust third pixel grayscales of transition pixels in the grayscale transition region to be gradually increased in a direction from the display image region to the peripheral region.

For example, in the drive device of the display panel provided by an embodiment of the present disclosure, grayscale change step lengths of the third pixel grayscales of the transition pixels in the grayscale transition region are same.

At least one embodiment of the present disclosure further provides a drive device of a display panel, the drive device comprises a memory configured to store non-transitory computer readable instructions; and a processor configured to execute the non-transitory computer readable instructions, when the non-transitory computer readable instructions are executed by the processor, one or more steps in the image processing method according to any one of the above embodiments is performed.

At least one embodiment of the present disclosure further provides a display panel, comprising the drive device provided by any one embodiment of the present disclosure.

At least one embodiment of the present disclosure further provides a wearable device, comprising the display panel provided by any one embodiment of the present disclosure.

BRIEF DESCRIPTION OF THE DRAWINGS

In order to clearly illustrate the technical solutions of the embodiments of the disclosure, the drawings of the embodiments will be briefly described in the following; it is obvious

FIG. 6 is a schematic diagram of a grayscale transition region in a first row in FIG. 3a;

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

The specific embodiments of the image processing method of the display panel, the drive device, the display panel and the wearable device, provided by the embodiment of the present disclosure, will be described in detail below with reference to the accompanying drawings. The shaped and the sizes of the various components in the accompanying drawings do not reflect true scale and are only intended to illustrate the content of the present disclosure.

Embodiments of the present disclosure provide an image processing method of a display panel, a drive device, a display panel and a wearable device, which are used for solving a problem that severe sawtooth sense appears on a display edge portion when a conventional display panel displays a non-rectangular image area, thereby improving a visual effect of the display panel.

Figure 1:
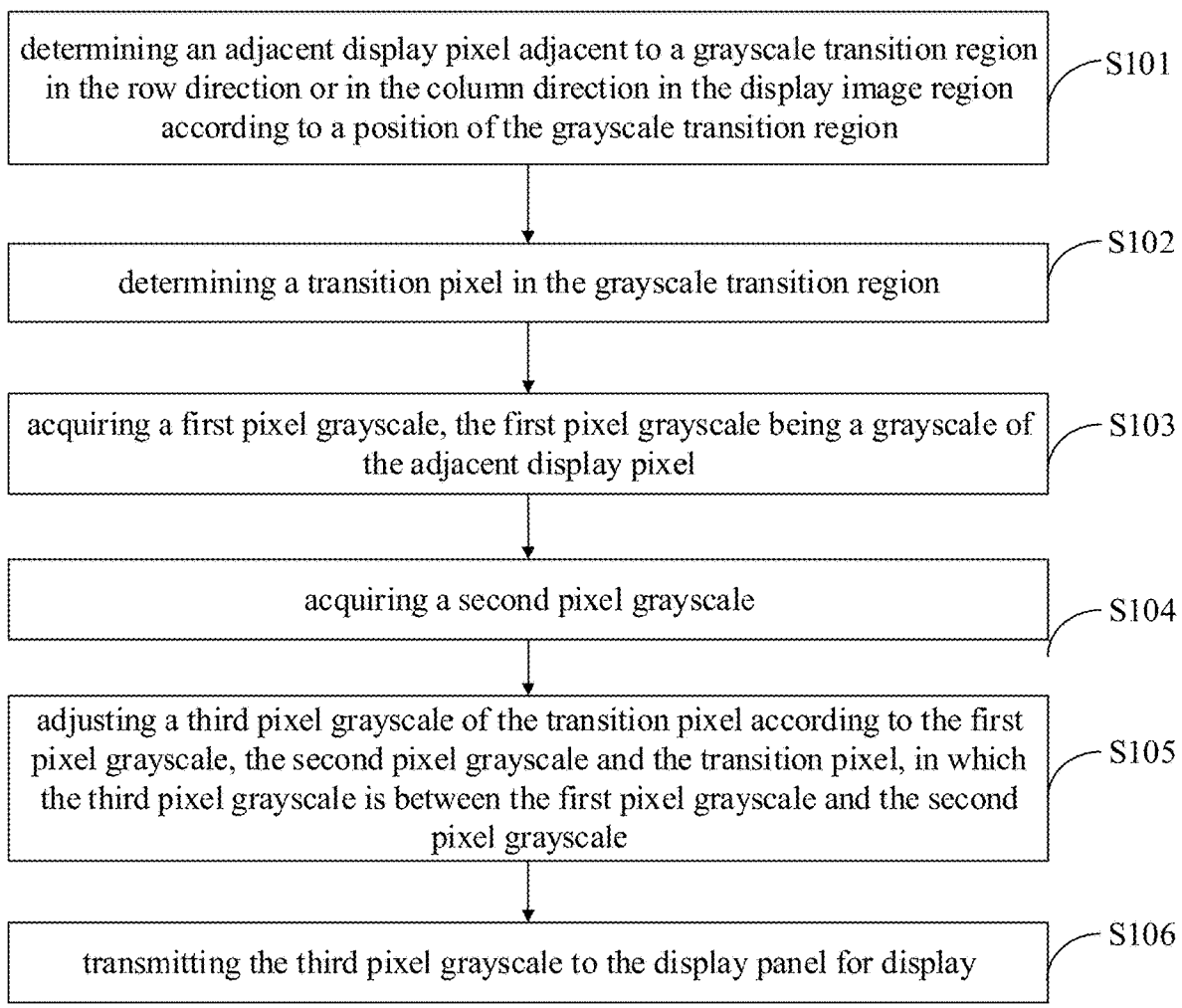
FIG. 1 is a flowchart of an image processing method provided by an embodiment of the present disclosure.

FIG. 1 is a flowchart of an image processing method provided by an embodiment of the present disclosure.

For instance, in the embodiment of the present disclosure, the display panel may comprises an active organic light-emitting diode (OLED) display panel or the like.

For instance, the display panel includes a display image region and a peripheral region. A pixel array arranged in an array is arranged on the display panel. The peripheral region includes grayscale transition regions. The grayscale transition regions are adjacent to the display image region. The display image region includes a plurality of display pixels arranged along a row direction and a column direction.

As shown in FIG. 1, the image processing method may comprise following steps:

S101: determining an adjacent display pixel adjacent to a grayscale transition region in the row direction or in the column direction in the display image region according to a position of the grayscale transition region;

S102: determining a transition pixel in the grayscale transition region;

S103: acquiring a first pixel grayscale, the first pixel grayscale being a grayscale of the adjacent display pixel;

S104: acquiring a second pixel grayscale;

S105: adjusting a third pixel grayscale of the transition pixel according to the first pixel grayscale, the second pixel grayscale and the transition pixel, in which the third pixel grayscale is between the first pixel grayscale and the second pixel grayscale; and S106: transmitting the third pixel grayscale to the display panel for display.

For instance, in the image processing method provided by the embodiment of the present disclosure, a shape of the display image region includes a non-rectangular shape. The non-rectangular shape may include a round but not limited thereto. According to actual design demands, the shape of the display image region may be triangular, rhombic, polygonal, elliptical or the like, and of course, may also be other irregular shapes.

For the convenience of user viewing, the display image region is generally disposed in the middle of the display panel. All areas on the display panel, except the display image region, are the peripheral region. Because pixels in the display panel are arranged in an array, for instance, as for a round display image region, there is a problem of edge sawteeth at a junction between the display image region and the peripheral region. Based on this, the image processing method provided by the embodiment of the present disclosure can adjust the grayscales of pixels disposed in the grayscale transition region and at the junction between the non-rectangular display image region and the peripheral region, thereby ameliorating the problem of edge sawteeth.

For instance, the display panel may be a rectangular display panel, and may also be a special-shaped display panel such as a round display panel, an elliptical display panel or the like.

For instance, the row direction and the column direction of the display pixels are perpendicular to each other.

For instance, in the step S104, the second pixel grayscale may be preset according to actual demands, for instance, preset by users. Moreover, for instance, the peripheral region may further include a background image region. The background image region includes a plurality of background pixels arranged in an array along the row direction and the column direction. The step S104 may include: according to the position of the grayscale transition region, determining an adjacent background pixel adjacent to the grayscale transition regions in the row direction or in the column direction in the background image region, the second pixel grayscale being a grayscale of the adjacent background pixel.

For instance, pixel grayscales of the plurality of display pixels in the display image region may be different from each other and may also be all the same. Pixel grayscales of the plurality of background pixels in the background image region may be different from each other and may also be all the same. The embodiments of the present disclosure is not limited thereto.

For instance, in the background image region, pixel grayscales may be provided for all pixels in the background image region; or pixel grayscales (namely the second pixel grayscale) may be provided for only a portion of pixels (e.g., the adjacent background pixels) adjacent to the grayscale transition regions in the background image region, and the pixel grayscales are not provided for pixels in remaining areas of the background image region; or pixels (e.g., the adjacent background pixels) may also be only arranged in areas adjacent to the grayscale transition regions of the background image region, and pixel grayscales (namely the second grayscale) are provided for these pixels.

It should be noted that in the descriptions of the present disclosure, pixels in the pixel array that are disposed in the display image region are display pixels; pixels in the pixel array that are disposed in the grayscale transition regions are transition pixels; and pixels in the pixel array that are disposed in the background image region are background pixels.

For instance, before the image processing method provided by the embodiment of the present disclosure is performed, positions of the grayscale transition regions adjacent to the display image region can be predetermined and stored according to the shape of the display image region. In this way, after the step of acquiring the first pixel grayscale of the adjacent display pixel adjacent to each of the grayscale transition regions in the display image region and the second pixel grayscale, the third pixel grayscale of the transition pixel in each grayscale transition region can be directly adjusted according to the stored position of each grayscale transition region, the first pixel grayscale and the second pixel grayscale, so that the third pixel grayscale can be between the first pixel grayscale of the adjacent display pixel and the second pixel grayscale, thereby reducing the brightness and the contrast of the edge between the display image region and the peripheral region, effectively ameliorating the problem of edge sawteeth, and enhancing customer experience.

For instance, an image displayed on the display panel may be fixed and may also change over time. For instance, when the displayed image changes over time, the image processing method provided by the present disclosure can determine positions of grayscale transition regions in real time according to the image displayed on the display panel and determine the third pixel grayscales of the transition pixels in the grayscale transition regions. At this point, the grayscale transition regions may be different according to different display images. The embodiment of the present disclosure is not limited thereto. When the displayed image is fixed, the grayscale transition regions of the display panel can be preset according to the fixed display image, and a corresponding relationship among the third pixel grayscale of the transition pixel in the grayscale transition region, the first pixel grayscale of the adjacent display pixel and the second pixel grayscale can also be preset and stored in a memory of the display panel and directly read into cache for processing by a processor as required. At this point, the grayscale transition regions are fixed in the display process.

Figure 2:
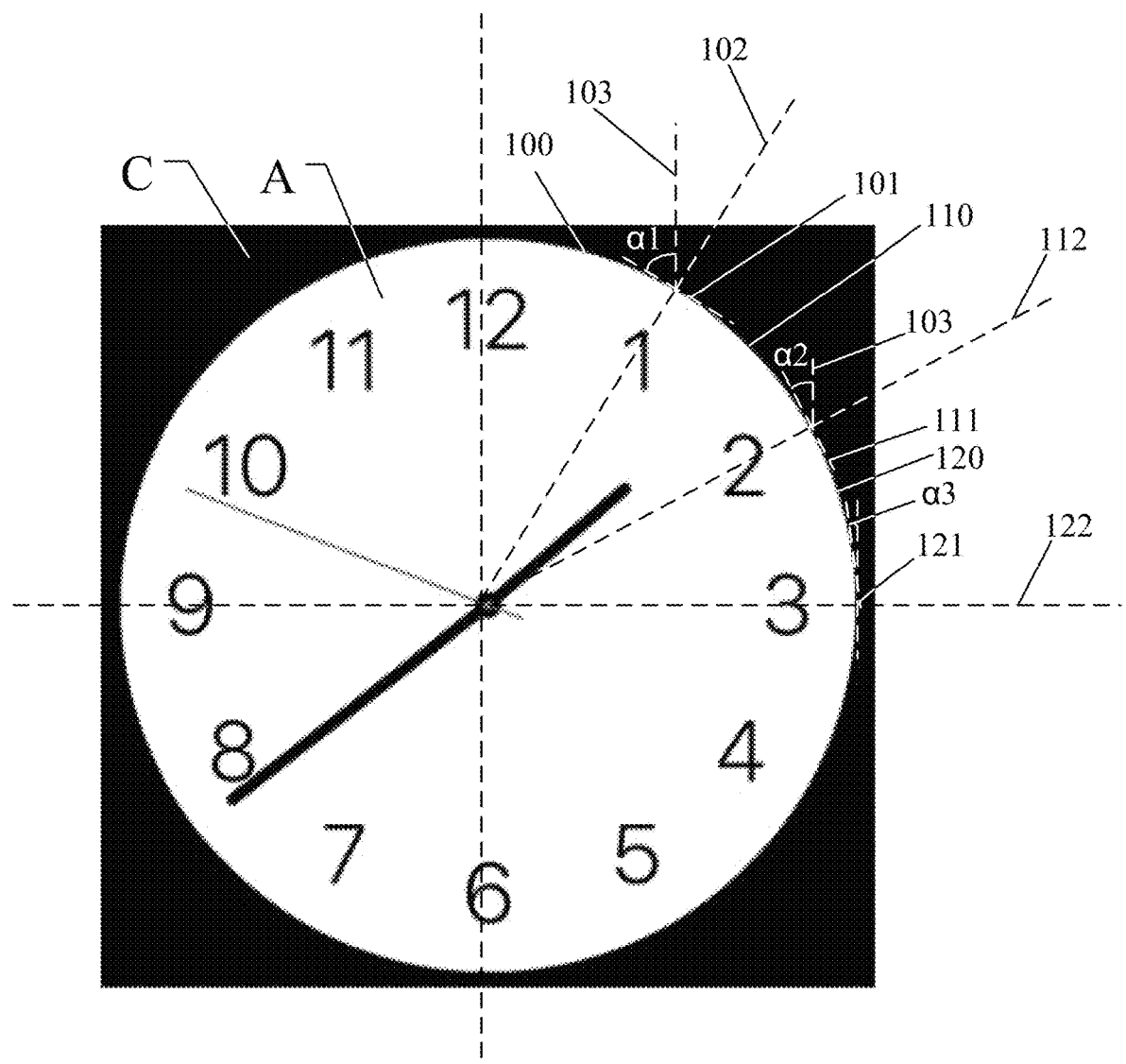
FIG. 2 is a schematic structural view of a display panel to which the image processing method provided by an embodiment of the present disclosure is applied.
Figure 3A:
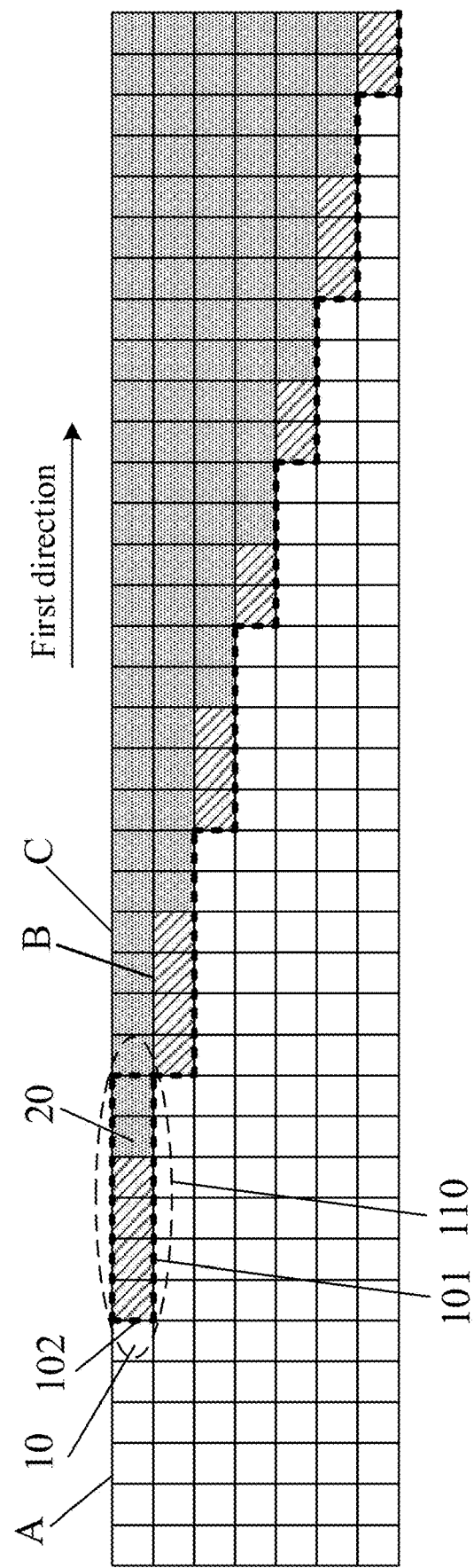
FIG. 3a is a schematic diagram of a grayscale transition region in an area from 12 to 1 in FIG. 2.
Figure 3B:
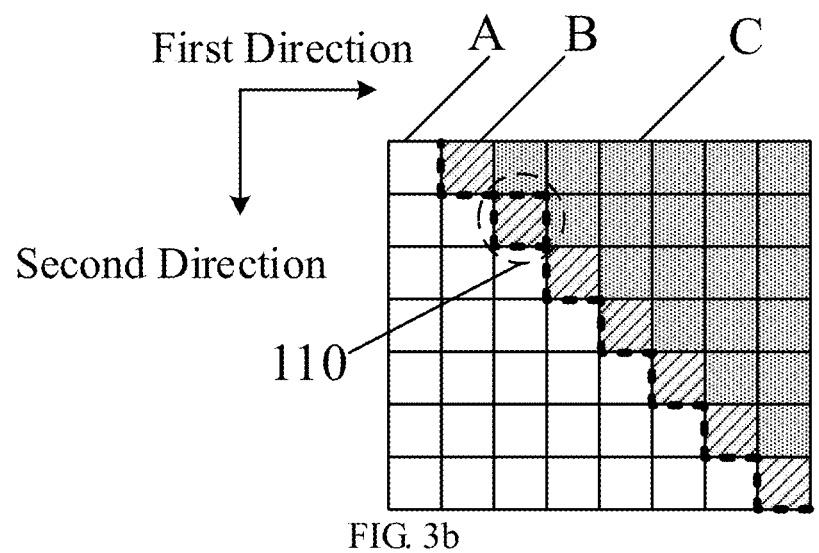
FIG. 3b is a schematic diagram of a grayscale transition region in an area from 1 to 2 in FIG. 2.
Figure 3C:
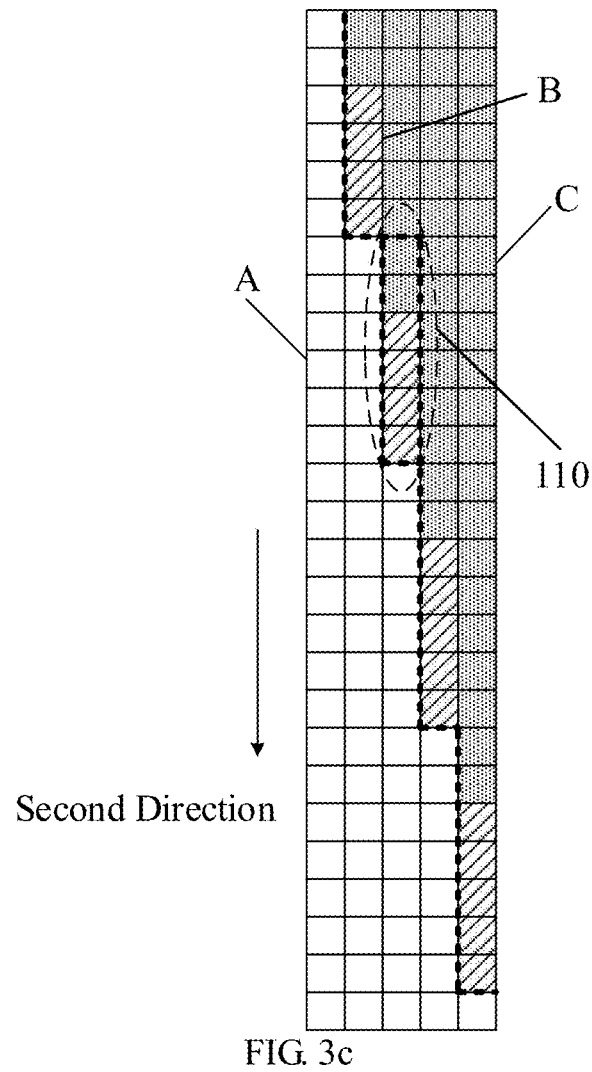
FIG. 3c is a schematic diagram of a grayscale transition region in an area from 2 to 3 in FIG. 2.
Figure 4:
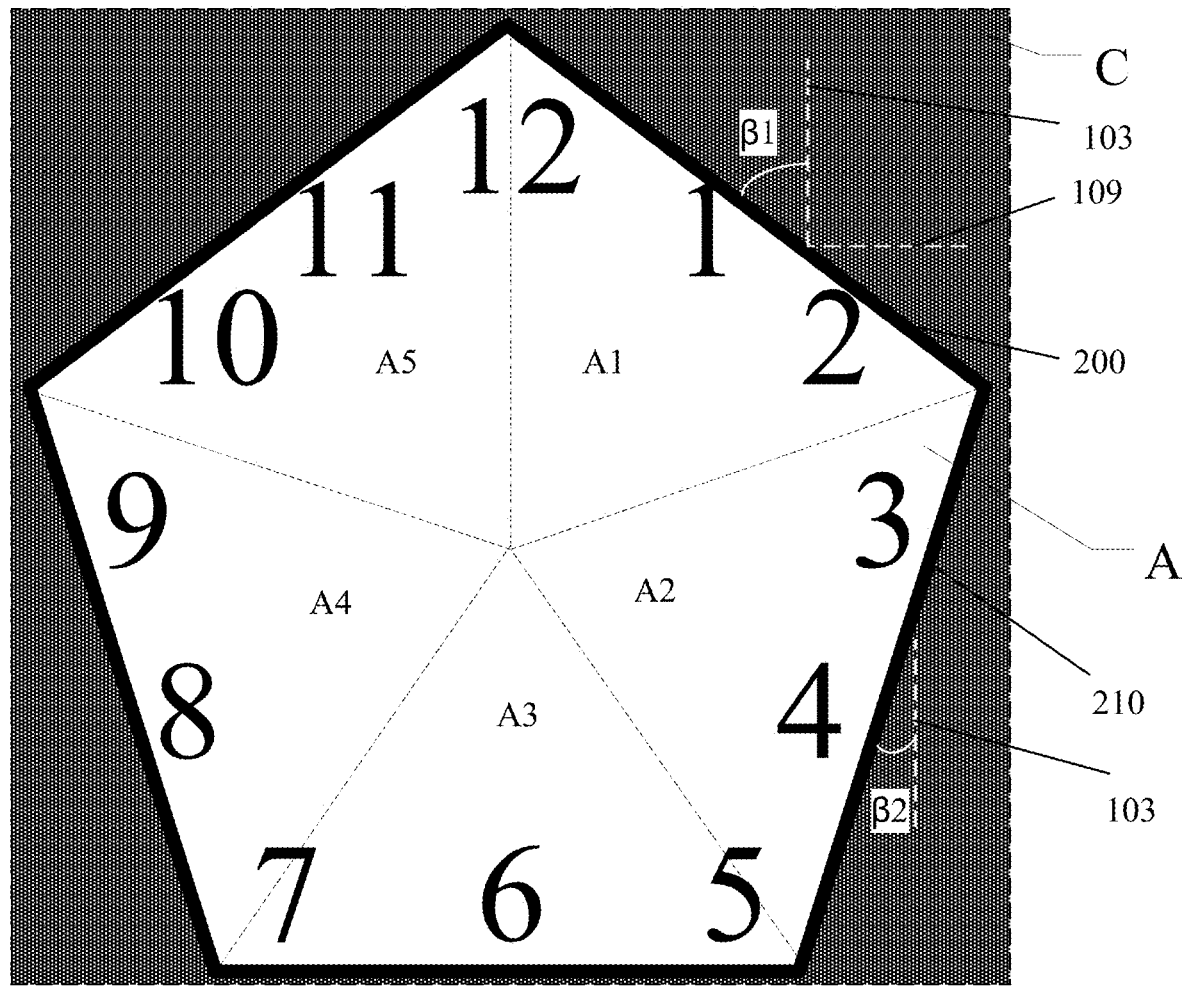
FIG. 4 is another schematic structural view of a display panel to which the image processing method provided by one embodiment of the present disclosure is applied.
Figure 5A:
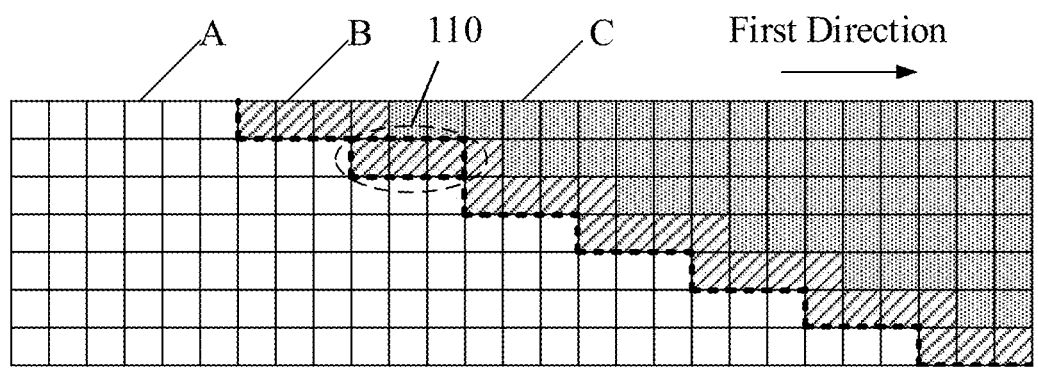
FIG. 5a is a schematic diagram of a grayscale transition region at a boundary of a first triangular sub-area A1.
Figure 5B:
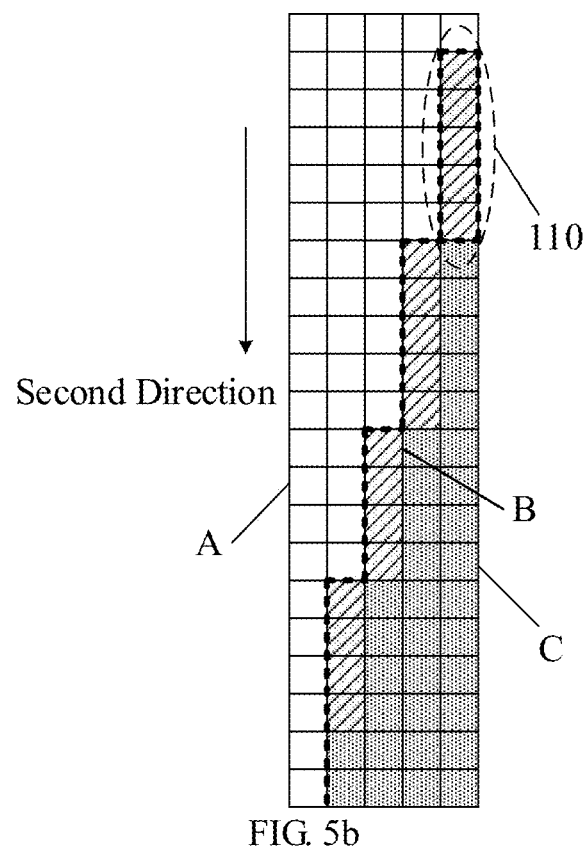
FIG. 5b is a schematic diagram of a grayscale transition region at a boundary of a second triangular sub-area A2.

FIG. 2 is a schematic structural view of a display panel to which the image processing method provided by an embodiment of the present disclosure is applied; FIG. 3a is a schematic diagram of a grayscale transition region in an area from 12 to 1 in FIG. 2; FIG. 3b is a schematic diagram of a grayscale transition region in an area from 1 to 2 in FIG. 2; FIG. 3c is a schematic diagram of a grayscale transition region in an area from 2 to 3 in FIG. 2. FIG. 4 is another schematic structural view of a display panel to which the image processing method provided by one embodiment of the present disclosure is applied; FIG. 5a is a schematic diagram of a grayscale transition region at a boundary of a first triangular sub-area A1; FIG. 5b is a schematic diagram of a grayscale transition region at a boundary of a second triangular sub-area A2.

For instance, as shown in FIG. 3a, an edge of the display image region includes a polygonal line segment formed by connection of first line segments 101 and second line segments 102 (the first line segment 101 indicates a line segment extending along the row direction, and the second line segment 102 indicates a line segment extending along the column direction) extending along the row direction and the column direction, and a boundary line between the display image region and the peripheral region here is the polygonal line segment formed by connection of a plurality of first line segments 101 and a plurality of second line segments 102. For instance, as shown in FIGS. 3a-3c and FIGS. 5a-5b, the boundary line between the display image region and the peripheral region is a saw-toothed polygonal line segment, that is, at the micro level (namely in the pixel level), the shape of the microscopic edge of the display image region is a sawtooth shape encircled by the polygonal line segments.

How to determine the position of the grayscale transition region adjacent to the display image region will be described in detail below according to the specific shape of the microscopic edge of the display image region.

For instance, the position of the grayscale transition region may be determined according to following methods.

The step S102 may include: forming a virtual rectangular area in the peripheral region by taking adjacent two line segments as adjacent two sides; and determining a quantity and an arrangement mode of transition pixels in the grayscale transition region according to the virtual rectangular area. For instance, the virtual rectangle formed in the peripheral region by taking adjacent two line segments (e.g., the first line segment 102 and the second line segment 102) as adjacent two sides includes M rows and N columns of pixels, and both M and N are positive integers. In an example as shown in FIG. 3a, a virtual rectangle 110

(disposed in elliptical dotted line) includes one row and a plurality of columns of pixels.

For instance, in the step S102, determining a quantity and an arrangement mode of the transition pixels in the grayscale transition region according to the virtual rectangular area includes:

when the virtual rectangular area includes one row and a plurality of columns of pixels, determining that the grayscale transition region includes a plurality of transition pixels disposed in the one row and adjacent to the display image region in the virtual rectangular area;

when the virtual rectangular area includes a plurality of rows and one column of pixels, determining that the grayscale transition region includes a plurality of transition pixels disposed in the one column and adjacent to the display image region in the virtual rectangular area; and when the virtual rectangular area includes one row and one column of pixels, determining that the grayscale transition region includes one transition pixel adjacent to the display image region in the virtual rectangular area.

For instance, at least portion of pixels in the virtual rectangular area are transition pixels. For instance, all the pixels in the virtual rectangular area may be transition pixels. As shown in FIG. 3b, when the virtual rectangular area includes one row and one column of pixels, the grayscale transition region may include one pixel disposed in the virtual rectangular area, namely the grayscale transition region may include one transition pixel. Moreover, for instance, as shown in FIG. 3a, when the virtual rectangular area includes one row and six columns of pixels, adjacent four pixels in the same row of the virtual rectangular area may be transition pixels, namely the grayscale transition region may include the four transition pixels disposed in the same row. As shown in FIG. 3c, when the virtual rectangular area includes six rows and one column of pixels, adjacent four pixels in the same column of the virtual rectangular area may be transition pixels, namely the grayscale transition region may include the four transition pixels disposed in the same column.

For instance, the transition pixels may include all the pixels in the virtual rectangular area and a portion of pixels in the peripheral region in an extending direction of the grayscale transition region. As shown in FIG. 5a, when the virtual rectangular area includes one row and three columns of pixels, the grayscale transition region may include three pixels disposed in the virtual rectangular area and one pixel adjacent to the virtual rectangular area in a first direction (for instance, the first direction indicates the extending direction of the grayscale transition region), that is, the grayscale transition region may include four transition pixels disposed in the same row.

For another instance, according to the specific shape of the display image region, at the junction between the display image region and the peripheral region, the macroscopic edge of the display image region may be a straight line, or the macroscopic edge of the display image region may also be a curved line. For instance, when the specific shape of the display image region is a triangle, a diamond or a polygon, the case that the macroscopic edge of the display image region is a straight line may occur; and when the specific shape of the display image region is a circle or an ellipse, the case that the macroscopic edge of the display image region is a curved line may occur. Of course, as for the same display image region, there may also be the case that the macroscopic edge of the display image region comprises a curved line and a straight line at the same time, and the present disclosure is not limited thereto.

It should be noted that "the macroscopic edge of the display image region" indicates the boundary of the overall shape of the display image region at the macro level. For instance, if the display image region is round, the macroscopic edge of the display image region is a curved line; and if the boundary of the display image region is a polygon such as a triangle or a diamond, the macroscopic edge of the display image region is a straight line.

How to determine the position of each grayscale transition region adjacent to the display image region will be specifically described in detail below according to the characteristics when the macroscopic edge of the display image region is a straight line and a curved line respectively.

For instance, in the step S102, when the macroscopic edge of the display image region is a curved line, the positions of the grayscale transition regions can be determined according to a following method:

when an included angle between a tangential line of the macroscopic edge of the display image region and the column direction of the pixel array is greater than a first default included angle θ1 and less than 90°, each grayscale transition region adjacent to the display image region may include a plurality of transition pixels disposed in one row and adjacent to the display image region in the peripheral region;

when the included angle between the tangential line of the macroscopic edge of the display image region and the column direction of the pixel array is greater than 0° and less than a second default included angle θ2, each grayscale transition region adjacent to the display image region may include a plurality of transition pixels disposed in one column and adjacent to the display image region in the peripheral region; and when the included angle between the tangential line of the macroscopic edge of the display image region and the column direction of the pixel array is greater than or equal to the second default included angle θ2 and less than or equal to the first default included angle θ1, each grayscale transition region adjacent to the display image region may include one transition pixel adjacent to the display image region in the peripheral region.

For instance, both the first default included angle θ1 and the second default included angle θ2 are acute angles; the first default included angle θ1 is greater than or equal to 45° and less than 90°, and the second default included angle θ2 is less than or equal to 45° and greater than 0°.

It should be noted that the second default included angle θ2 is usually less than the first default included angle θ1. For instance, the second default included angle θ2 may be 30° and the first default included angle θ1 may be usually 60°. Of course, the second default included angle θ2 may also be equal to the first default included angle θ1. For instance, both the second default included angle θ2 and the first default included angle θ1 are 45°. No limitation will be given here.

For instance, as shown in FIG. 2, the display panel includes a display image region A and a peripheral region. A first macroscopic edge 100, a second macroscopic edge 110 and a third macroscopic edge 120 are located between the display image region A and the peripheral region. The peripheral region includes a background image region C and a grayscale transition region B (not shown in FIG. 2) disposed between the display image region A and the background image region C. The display image region A may be round. At this point, the first default included angle may be set to be 60°, and the second default included angle may be set to be 30°. For instance, the round display image region A can be equally divided into four portions along horizontal and vertical directions, and each portion is a sector with a 90 degree central angle. Taking a sector on a top right corner in FIG. 2 as an example, the sector may be divided into three equal parts along the central angle, and the three equal parts include a first sectorial sub-area from a number 12 to a number 1, a second sectorial sub-area from a number 1 to a number 2, and a third sectorial sub-area from a number 2 to a number 3. For instance, the first macroscopic edge 100 is between the first sectorial sub-area and the peripheral area; the second macroscopic edge 110 is between the second sectorial sub-area and the peripheral area; and the third macroscopic edge 120 is between the third sectorial sub-area and the peripheral area.

For instance, as shown in FIGS. 2 and 3a, in the first sectorial sub-area, a normal line 102 of the first macroscopic edge 100 and a tangent line 101 of the first macroscopic edge 100 are perpendicular to each other, and an included angle α1 between the tangent line 101 of the first macroscopic edge 100 between the display image region A and the peripheral region and the column direction 103 of the pixel array is greater than 60° and less than 90°, therefore, each of grayscale transition regions B adjacent to the first sectorial sub-area may include a plurality of transition pixels located in one row and adjacent to the first sectorial sub-area in the peripheral region. For instance, at the first macroscopic edge 100 corresponding to the first sectorial sub-area, each of the grayscale transition regions B may include 2 to 4 transition pixels located in one row.

For instance, as shown in FIGS. 2 and 3b, in the second sectorial sub-area, a normal line 112 of the second macroscopic edge 110 and a tangent line 111 of the second macroscopic edge 110 are perpendicular to each other, and an included angle α2 between the tangent line ill of the second macroscopic edge 110 between the display image region A and the peripheral region and the column direction 103 of the pixel array is greater than 300 and less than 60°, therefore, each of grayscale transition regions B adjacent to the second sectorial sub-area may include one transition pixel adjacent to the second sectorial sub-area in the peripheral region.

For instance, as shown in FIGS. 2 and 3c, in the third sectorial sub-area, an included angle α3 between a tangent line 121 of the third macroscopic edge 120 between the display image region A and the peripheral region and the column direction 103 of the pixel array is greater than 0° and less than 30°, therefore, each of grayscale transition regions B adjacent to the third sectorial sub-area may include a plurality of transition pixels located in one column and adjacent to the third sectorial sub-area in the peripheral region. For instance, at the third macroscopic edge 120 corresponding to the third sectorial sub-area, each of the grayscale transition regions B may include 4 or 5 transition pixels located in one column.

What has been described above is only an example by taking the case that the display image region is round as an example. The above image processing method provided by the embodiment of the present disclosure does not specifically limit the shape of the display image region.

For instance, in the step S102, when the macroscopic edge of the display image region is a straight line, the positions of the grayscale transition regions can be determined by a following method:

when an included angle between the macroscopic edge of the display image region and the column direction of the pixel array is greater than a first default included angle θ1 and less than 90°, each grayscale transition region adjacent to the display image region may include a plurality of transition pixels located in one row and adjacent to the display image region in the peripheral region;

when an included angle between the macroscopic edge of the display image region and the column direction of the pixel array is greater than 0° and less than a second default included angle θ2, each grayscale transition region adjacent to the display image region may include a plurality of transition pixels located in one column and adjacent to the display image region in the peripheral region; and when an included angle between the macroscopic edge of the display image region and the column direction of the pixel array is greater than or equal to the second default included angle θ2 and less than or equal to the first default included angle θ1, each grayscale transition region adjacent to the display image region may include one transition pixel adjacent to the display image region in the peripheral region.

It should be noted that the second default included angle θ2 is usually less than the first default included angle θ1. For instance, the second default included angle θ2 may be 300 and the first default included angle θ1 is generally 60°. Of course, the second default included angle θ2 may also be equal to the first default included angle θ1. For instance, both the second default included angle θ2 and the first default included angle θ1 are 45°.

For instance, a case that the macroscopic edge of the display image region is a straight line is described by taking a case that the display image region A is a pentagon as an example. At this point, both the first default included angle θ1 and the second default included angle θ2 may be set to be 45°. For instance, as shown in FIG. 4, the pentagonal display image region may be can be equally divided into 5 equal portions along a center and sides, and each portion is an isosceles triangle with a vertex angle of 72°. The 5 equal portions are respectively a first triangular sub-area A1, a second triangular sub-area A2, a third triangular sub-area A3, a fourth triangular sub-area A4 and a fifth triangular sub-area A5. At junctions between the peripheral region and the first triangular sub-area A1, the second triangular sub-area A2, the fourth triangular sub-area A4 and the fifth triangular sub-area A5, a normal line direction of the macroscopic edge of the display image region does not coincide with the row direction 109 and the column direction 103 of the pixel array; and at a junction between the third triangular sub-area A3 and the peripheral region, a normal line direction of the macroscopic edge of the display image region coincides with the column direction 103 of the pixel array. Therefore, grayscale transition regions (not shown in FIG. 4) are provided at the junctions between the peripheral region and the first triangular sub-area A1, the second triangular sub-area A2, the fourth triangular sub-area A4 and the fifth triangular sub-area A5.

For instance, as shown in FIGS. 4 and 5a, in the first triangular sub-area A1 and the fifth triangular sub-area A5 (namely two isosceles triangles on two sides of a vertex angle of the pentagon), taking the first triangular sub-area A1 as an example, an included angle β1 between a macroscopic edge 200 corresponding to the first triangular sub-area A1 and the column direction 103 of the pixel array is 54°, so the included angle β1 is greater than 450, namely greater than the first default included angle θ1. Therefore, each of the grayscale transition regions B adjacent to the macroscopic edge 200 may include a plurality of transition pixels located in one row and adjacent to the first triangular sub-area A1 in the peripheral region. For instance, at macroscopic edges corresponding to the first triangular sub-area A1 and the fifth triangular sub-area A5, each of the grayscale transition regions B may include 3 or 4 transition pixels located in one row.

For instance, as shown in FIGS. 4 and 5b, in the second triangular sub-area A2 and the fourth triangular sub-area A4 (namely two isosceles triangles on two sides of a base angle of the pentagon), taking the second triangular sub-area A2 as an example, an included angle β2 between a macroscopic edge 210 corresponding to the second triangular sub-area A2 and the column direction 103 of the pixel array is 18°, so the included angle β2 is less than 45°, namely less than the second default included angle θ2. Therefore, each of the grayscale transition regions B adjacent to the macroscopic edge 210 may include a plurality of transition pixels located in one column and adjacent to the second triangular sub-area A2 in the peripheral region. For instance, at macroscopic edges corresponding to the second triangular sub-area A2 and the fourth triangular sub-area A4, each of the grayscale transition regions may include 4 or 5 transition pixels located in one column.

What has been described above is only an example which takes the case that the display image region is a pentagon as an example. The above image processing method provided by the embodiment of the present disclosure does not specifically limit the shape of the display image region.

It should be noted that in the present disclosure, "included angles" (namely the included angle α1, the included angle α2, the included angle α3, the included angle β1 and the included angle β2) are all acute angles.

For instance, in the above image processing method provided by the embodiment of the present disclosure, the position of the grayscale transition region may be determined according to the shape of the display image region. Meanwhile, the number of the transition pixels included in each grayscale transition region may be different. For instance, the number of the transition pixels in each grayscale transition region may be greater than 1. Therefore, the third pixel grayscales of the transition pixels in each grayscale transition region can be adjusted by various methods, so as to achieve an effect of edge blurring and effectively weaken the sawtooth sense at the edge.

For instance, the step S101 may include following steps: determining an extending direction of the grayscale transition region according to the position of the grayscale transition region; and determining the adjacent display pixel adjacent to the grayscale transition region in the display image region in the extending direction of the grayscale transition region.

For instance, when the peripheral region includes the background image region, the step S101 may further include: determining an extending direction of the grayscale transition region according to the position of the grayscale transition region; and determining the adjacent background pixel adjacent to the grayscale transition region in the background image region in the extending direction of the grayscale transition region. In the step S104, the second pixel grayscale is a grayscale of the adjacent background pixel.

For instance, the extending direction of the grayscale transition region may indicate a direction in which the transition pixels are arranged in the grayscale transition region. As shown in FIGS. 3a and 5a, in a case where the grayscale transition region includes a plurality of transition pixels located in one row, the extending direction of the grayscale transition region may be the row direction of the pixel array, namely a first direction in FIGS. 3a and 5a. As shown in FIGS. 3c and 5b, in a case where the grayscale transition region includes a plurality of transition pixels located in one column, the extending direction of the grayscale transition region may be the column direction of the pixel array, namely the second direction in FIGS. 3c and 5b. As shown in FIG. 3b, in a case where the grayscale transition region only includes one transition pixel, the extending direction of the grayscale transition region may be the row direction of the pixel array (namely the first direction in FIG. 3b), and may also be the column direction of the pixel array (namely the second direction in FIG. 3b).

For instance, in the display image region, the number of the adjacent display pixels may be 1. In the background image region, the number of the adjacent background pixels may also be 1. Taking a grayscale transition region in a first row shown in FIG. 3a as an example, in the display image region A, the adjacent display pixel is a pixel 10; and in the background image region C, the adjacent background pixel is a pixel 20.

It should be noted that there may also be a plurality of adjacent display pixels and a plurality of adjacent background pixels. At this point, the first pixel grayscale of the adjacent display pixels indicates an average value of first pixel grayscales of the plurality of adjacent display pixels, and the second pixel grayscale of the adjacent background pixels indicates an average value of second pixel grayscales of the plurality of adjacent background pixels.

For instance, in the step S105, adjusting the third pixel grayscale of the transition pixel according to the first pixel grayscale, the second pixel grayscale and the transition pixel may include: adjusting the third pixel grayscale of the transition pixel according to the first pixel grayscale, the second pixel grayscale, and the arrangement mode and the number of transition pixels in the grayscale transition region, and the like.

For instance, in order to reduce the amount of calculation data, third pixel grayscales of a plurality of transition pixels in the grayscale transition region may be set to be same value. For instance, the third pixel grayscales of the plurality of transition pixels in the grayscale transition region may be an average value of the first pixel grayscale of the adjacent display pixel and the second pixel grayscale (for instance, the grayscale of the adjacent background pixel).

For instance, in order to further weaken the sense of edge sawteeth, in the above image processing method provided by the embodiment of the present disclosure, in one example, the step S105 may include: when the first pixel grayscale of the adjacent display pixel is greater than the second pixel grayscale, in the extending direction of the grayscale transition region, adjusting third pixel grayscales of transition pixels in the grayscale transition region to be gradually decreased in a direction from the display image region to the peripheral region. For instance, in a case of displaying a picture in white-black as shown in FIG. 2, in the display image region, the first pixel grayscale of the adjacent display pixel is white (e.g., 255); and in the background image region, the second pixel grayscale of the adjacent background pixel is black (e.g., 0). Thus, the third pixel grayscales of the transition pixels in the grayscale transition region can be gradually decreased, to gradually reduce the brightness, thereby achieving the effect of edge blurring, and effectively weakening the sense of edge sawteeth.

For instance, in another example, the step S105 may include: when the first pixel grayscale of the adjacent display pixel is less than the second pixel grayscale, in the extending direction of the grayscale transition region, adjusting the third pixel grayscales of the transition pixels in the grayscale transition region to be gradually increased in a direction from the display image region to the peripheral region. For instance, in the case of displaying a picture in white-black, in the display image region, the first pixel grayscale of the adjacent display pixel is black; and in the background image region, the second pixel grayscale of the adjacent background pixel is white. Thus, the third pixel grayscales of the transition pixels in the grayscale transition region can be gradually increased, to gradually increase the brightness, thereby achieving the effect of edge blurring, and effectively weakening the sense of edge sawteeth.

For another instance, in the above image processing method provided by the embodiment of the present disclosure, grayscale change step lengths of the third pixel grayscales of the transition pixels in the grayscale transition region may be same, so as to achieve the optimum effect of edge blurring and effectively weaken the sense of edge sawteeth. For instance, taking third pixel grayscales of respective transition pixels in the grayscale transition region in the first row shown in FIG. 3a as an example, for instance, in the display image region A on left, the first pixel grayscale of the adjacent display pixel 10 is X, and in the background image region C on right, the second pixel grayscale of the adjacent background pixel 20 is 0. Taking the first pixel grayscale X of the adjacent display pixel 10 as a reference grayscale and the second pixel grayscale 0 of the adjacent background pixel 20 as a final value of grayscale reduction processing, the third pixel grayscales of four transition pixels in the grayscale transition region B is subjected to grayscale reduction processing with an equal step length, in which the step length is (X−0)/(4+1)(grayscale). For instance, when a value of X is 100, a value of the step length is 20.

Figure 6:

FIG. 6 is a schematic diagram of a grayscale transition region in a first row as shown in FIG. 3a. As shown in FIGS. 3a and 6, after the third pixel grayscales of the transition pixels in the grayscale transition region B are adjusted, in the extending direction of the grayscale transition region B, in the direction from the display image region A to the background image region C, the brightness of the transition pixels in the grayscale transition region is slowly transitioned. Therefore, the local sawtooth sense can be weakened, the overall appearance can be blurred after edge processing, the edge contrast can be reduced, and the effect of reducing the sawtooth sensation can be achieved.

For instance, the step S106 further includes: transmitting grayscales of display pixels in the display image region to the display image region for display. When the peripheral region includes the background image region and the background image region is provided with background pixels for display, the step S106 further includes: transmitting grayscales of the background pixels in the background image region to the background image region for display.

It should be noted that the grayscales of the display pixels in the display image region includes the first pixel grayscale; and the grayscales of the background pixels in the background image region includes the second pixel grayscale.

For instance, in the step S106, the grayscales of the display pixels in the display image region, the grayscales of the background pixels in the background image region, and the third pixel grayscale can be transmitted to the display panel by a motherboard of the display panel.

Figure 7:
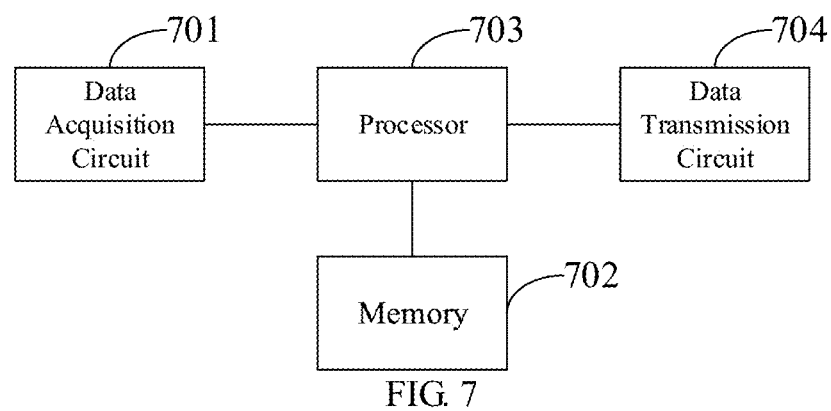
FIG. 7 is a schematic structural view of a drive device of a display panel provided by an embodiment of the present disclosure.

An embodiment of the present disclosure further provides a drive device of a display panel. The drive device may be applied to a display panel, e.g., an active organic electroluminescent display panel. FIG. 7 is a schematic structural view of a drive device of a display panel provided by an embodiment of the present disclosure. As shown in FIG. 7, the drive device may comprise a data acquisition circuit 701, a memory 702, a processor 703, and a data transmission circuit 704.

For instance, the display panel includes a display image region and a peripheral region; and a pixel array arranged in an array is arranged on the display panel. The peripheral region includes grayscale transition regions. The grayscale transition regions are adjacent to the display image region. The display image region includes a plurality of display pixels arranged along a row direction and a column direction.

The data acquisition circuit 701 is configured to acquire a first pixel grayscale and a second pixel grayscale. The first pixel grayscale is a grayscale of an adjacent display pixel adjacent to a grayscale transition region in the display image region.

The memory 702 is configured to store a position of the grayscale transition region.

The processor 703 is configured to, according to the stored position of the grayscale transition region, determine the adjacent display pixel adjacent to the grayscale transition region in the row direction or in the column direction in the display image region, the first pixel grayscale being the grayscale of the adjacent display pixel; determine a transition pixel in the grayscale transition region; and adjust a third pixel grayscale of the transition pixel in the grayscale transition region according to the first pixel grayscale, the second pixel grayscale and the transition pixel. For instance, the third pixel grayscale is between the first pixel grayscale of the adjacent display pixel and the second pixel grayscale.

The data transmission circuit 704 is configured to transmit the third pixel grayscale to the display panel for display.

For instance, the memory 702 may also be configured to store the first pixel grayscale and/or the second pixel grayscale.

For instance, the data transmission circuit 704 is also configured to transmit grayscales of display pixels in the display image region to the display image region for display. When the peripheral region includes a background image region and the background image region is provided with background pixels for display, the data transmission circuit 704 is also configured to transmit grayscales of the background pixels in the background image region to the background image region for display.

For instance, in the background image region, the background pixels can be arranged in an array along the row direction and the column direction. The processor 703 is also configured to determine an adjacent background pixel adjacent to the grayscale transition region in the row direction or in the column direction in the background image region according to the position of the grayscale transition region, the second pixel grayscale is a grayscale of the adjacent background pixel.

For instance, a shape of the display image region includes a non-rectangular shape (e.g., round and so on). An edge of the display image region includes a polygonal line segment formed by connection of line segments extending along the row direction and the column direction. The row direction and the column direction may be perpendicular to each other.

For instance, a step of determining the transition pixel in the grayscale transition region, performed by the processor 703, includes: forming a virtual rectangular area in the peripheral region by taking adjacent two line segments as adjacent two sides; and determining a quantity and an arrangement mode of transition pixels in the grayscale transition region according to the virtual rectangular area.

For instance, a step of determining the quantity and the arrangement mode of transition pixels in the grayscale transition region according to the virtual rectangular area, performed by the processor, includes:

when the virtual rectangular area includes one row and a plurality of columns of pixels, determining that the grayscale transition region includes a plurality of transition pixels disposed in the one row and adjacent to the display image region in the virtual rectangular area;

when the virtual rectangular area includes a plurality of rows and one column of pixels, determining that the grayscale transition region includes a plurality of transition pixels disposed in the one column and adjacent to the display image region in the virtual rectangular area; and when the virtual rectangular area includes one row and one column of pixels, determining that the grayscale transition region includes one transition pixel adjacent to the display image region in the virtual rectangular area.

It should be noted that the detailed description on the step of determining the transition pixel in the grayscale transition region performed by the processor 703 may refer to relevant description in the embodiment of the image processing method, and the repeated descriptions will be omitted here.

For instance, in the drive device provided by the embodiment of the present disclosure, at a junction between the display image region and the peripheral region, in a case that a macroscopic edge of the display image region is a straight line, when an included angle between the macroscopic edge of the display image region and the column direction of the pixel array is greater than a first default included angle and less than 90°, each grayscale transition region may include a plurality of transition pixels located in one row and adjacent to the display image region in the peripheral region; when the included angle between the macroscopic edge of the display image region and the column direction of the pixel array is greater than 0° and less than a second default included angle, each grayscale transition region may include a plurality of transition pixels located in one column and adjacent to the display image region in the peripheral region; when the included angle between the macroscopic edge of the display image region and the column direction of the pixel array is greater than or equal to the second default included angle and less than or equal to the first default included angle, each grayscale transition region may include one transition pixel adjacent to the display image region in the peripheral region.

For instance, in the drive device provided by the embodiment of the present disclosure, at the junction between the display image region and the peripheral region, in a case where the macroscopic edge of the display image region is a curved line, when an included angle between a tangential line of the macroscopic edge of the display image region and the column direction of the pixel array is greater than the first default included angle and less than 90°, each grayscale transition region may include a plurality of transition pixels located in one row and adjacent to the display image region in the peripheral region; when the included angle between the tangential line of the macroscopic edge of the display image region and the column direction of the pixel array is greater than 0° and less than the second default included angle, each grayscale transition region may include a plurality of transition pixels located in one column and adjacent to the display image region in the peripheral region; and when the included angle between the tangential line of the macroscopic edge of the display image region and the column direction of the pixel array is greater than or equal to the second default included angle and less than or equal to the first default included angle, the grayscale transition region may include one transition pixel adjacent to the macroscopic edge of the display image region in the peripheral region.

For instance, in one example, the display image region may be round, and in this case, the first default included angle may be 60° and the second default included angle may be 30°. In another example, the display image region may be pentagonal, and in this case, the first default included angle and the second default included angle both may be 45°.

For instance, when the first pixel grayscale of the adjacent display pixel is greater than the second pixel grayscale, the processor 703 is configured to: in the extending direction of the grayscale transition region, adjust third pixel grayscales of transition pixel in the grayscale transition region to be gradually decreased in a direction from the display image region to the peripheral region. Or when the first pixel grayscale of the adjacent display pixel is less than the second pixel grayscale, the processor 703 is configured to: in the extending direction of the grayscale transition region, adjust third pixel grayscales of transition pixel in the grayscale transition region to be gradually increased in a direction from the display image region to the peripheral region.

For instance, in the drive device provided by the embodiment of the present disclosure, grayscale change step lengths of the third pixel grayscales of the transition pixels in the grayscale transition region may be same.

Figure 8:
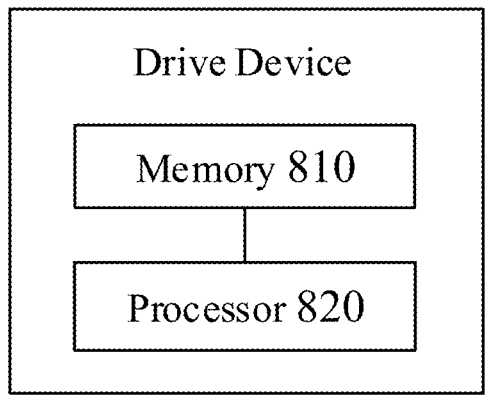
FIG. 8 is a schematic structural view of another drive device of a display panel provided by an embodiment of the present disclosure.

An embodiment of the present disclosure further provides another drive device of a display panel. FIG. 8 is a schematic structural view of another drive device of a display panel provided by an embodiment of the present disclosure. The drive device may be applied to a display panel, e.g., an active organic electroluminescent display panel.

For instance, as shown in FIG. 8, the drive device may include a memory 810 and a processor 820. The memory 810 is configured to store non-transitory computer readable instructions. The processor 820 is configured to execute the non-transitory computer readable instructions. When the non-transitory computer readable instructions are execute by the processor, one or more steps in the image processing method provided by any one of the above embodiments can be performed. The memory 810 and the processor 820 may be connected with each other through a bus system and/or a connecting mechanism (not shown) in other forms.

For instance, the processor 820 may be a central processing unit (CPU) or other forms of processing units having data processing capabilities and/or program execution capabilities, such as a graphics processing unit (GPU), a field-programmable gate array (FPGA), a tensor processing unit (TPU), or the like. For instance, the central processing unit (CPU) may be an X86, ARM architecture, or the like. The processor 820 may control other components in the drive device to perform desired functions.

For instance, the storage 810 may comprise an arbitrary combination of one or more computer program products. The computer program products may comprise various forms of computer-readable storage media, such as volatile memory and/or non-volatile memory. The volatile memory may comprise, for example, a random access memory (RAM) and/or a cache or the like. The non-volatile memory may comprise, for example, a read only memory (ROM), a hard disk, an erasable programmable read only memory (EPROM), a portable compact disc-read only memory (CD-ROM), a USB memory, a flash memory, and the like. One or more computer programs may be stored on the computer-readable storage medium and the processor 820 may execute the non-transitory computer-readable instructions to implement various functions of the drive device. Various applications, various data, various data used and/or generated by the applications, and the like, may also be stored in the computer-readable storage medium.

It should be noted that the detailed description on the case of adopting the drive device to drive the display panel to display may refer to relevant description on the embodiments of the image processing method, and the repeated descriptions will be omitted here.

Figure 9:
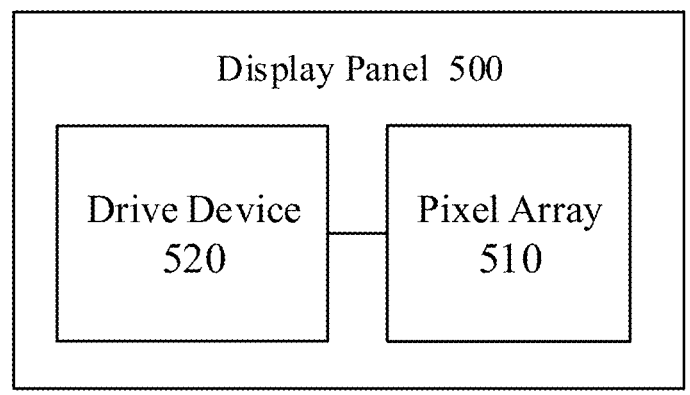
FIG. 9 is a schematic block diagram of a display panel provided by an embodiment of the present disclosure.

An embodiment of the present disclosure further provides a display panel. FIG. 9 is a schematic block diagram of a display panel provided by an embodiment of the present disclosure. As shown in FIG. 9, the display panel 500 may comprise a drive device 520 provided by any one of the foregoing embodiments of the present disclosure and a pixel array 510. The pixel array 510 is arranged in an array, and the drive device 520 is configured to drive the pixel array 510 to display.

The display panel can reduce the brightness and the contrast of the edge between the display image region and the peripheral region, thereby effectively ameliorating the problem of edge sawteeth, improving the visual effect of the display panel, and enhancing customer experience.

For instance, the display panel 500 may be an active organic electroluminescent display panel. The display panel 500 may be applied to a mobile phone, a tablet, a television, a monitor, a notebook computer, a digital photo frame, a navigator, or any products or components having a display function.

It should be noted that other necessary components of the display panel shall be understood by those skilled in the art to be included, will not be further described here, and shall not be construed as the limitation of the present disclosure.

Figure 10:
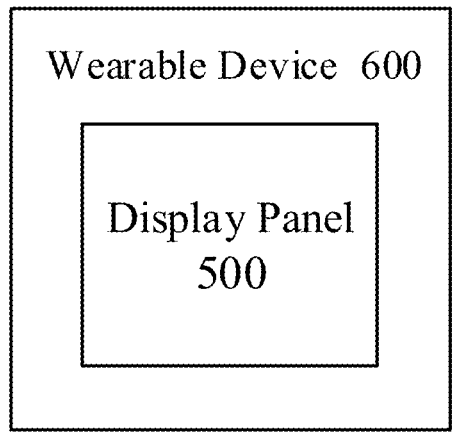
FIG. 10 is a schematic block diagram of a wearable device provided by an embodiment of the present disclosure.

An embodiment of the present disclosure further provides a wearable device. FIG. 10 is a schematic block diagram of a wearable device provided by an embodiment of the present disclosure. As shown in FIG. 10, the wearable device 600 provided by the embodiment of the present disclosure may comprise the display panel 500 provided by an embodiment of the present disclosure. Therefore, the wearable device 600 can reduce the brightness and the contrast of the edge between the display image region and the peripheral region, thereby effectively ameliorating the problem of edge sawteeth, improving the visual effect of the display panel, and enhancing customer experience.

For instance, the wearable device 600 may be a smart watch, and a display image region of the smart watch may be round, elliptical, etc. But the present disclosure is not limited thereto, the wearable device 600 may also be a smart bracelet, smart eyeglasses, and the like, which is not limited by the embodiments of the present disclosure.

It can be clearly understood by those skilled in the art through the description of the above embodiments that the embodiments of the present disclosure can be implemented by hardware, or may also be implemented by means of software plus a necessary general hardware platform. Based on such understanding, the technical solution of the embodiments of the present disclosure can be embodied in a form of a software product, and the software product may be stored in a non-volatile storage medium (which may be a CD-ROM, a USB flash disk, a mobile hard disk, etc.) and includes a number of instructions which are configured to allow a computer device (which may be a personal computer, a server, a network device, etc.) to perform the methods of respective embodiments of the present disclosure.

It should be understood by those skilled in the art that the accompanying drawings are only schematic diagrams of one embodiment, and the modules or processes in the accompanying drawings are not necessarily required for implementing the present disclosure.

It should be understood by those skilled in the art that the modules in the device provided by the embodiment can be distributed in the device provided by the embodiment according to the description of the embodiment, and can also be correspondingly changed and disposed in one or more devices different from the embodiment. The modules of the above embodiments can be combined into one module and can also be further split into a plurality of sub-modules.

An image processing method of a display panel, a drive device, a display panel and a wearable device, provided by an embodiment of the present disclosure, can determine the position of the grayscale transition region according to the shape of the display image region, and can adjust the third pixel grayscale of the transition pixel in the grayscale transition region according to the position of the grayscale transition region, the first pixel grayscale of the adjacent display pixel adjacent to the grayscale transition region in the display image region, and the second pixel grayscale to make the third pixel grayscale be between the first pixel grayscale and the second pixel grayscale, thereby reducing the brightness and the contrast of the edge between the display image region and the peripheral region, effectively ameliorating the problem of edge sawteeth, and enhancing customer experience.

Obviously, various changes and modifications can be made by the skilled in the art to the present disclosure, without departing from the spirits and the scope of the present disclosure. Therefore, so far as these changes and modifications of the disclosure fall in the scope of the claims and their equivalents of the present disclosure, the present disclosure shall also intend to cover such changes and modifications.

What is claimed is:

1. An image processing method of a display panel, wherein the display panel comprises a display image region and a peripheral region, the peripheral region comprises grayscale transition regions, the grayscale transition regions are adjacent to the display image region, a pixel array arranged in an array is arranged on the display panel, the display image region comprises a plurality of display pixels arranged along a row direction and a column direction, and the pixel array comprises the plurality of display pixels; and
the image processing method comprises:
    determining an adjacent display pixel adjacent to each grayscale transition region in the row direction or in the column direction in the display image region according to a position of the grayscale transition region;
    determining transition pixels in the grayscale transition region;
    acquiring a first pixel grayscale, wherein the first pixel grayscale is a grayscale of the adjacent display pixel;
    acquiring a second pixel grayscale;
    adjusting third pixel grayscales of the transition pixels according to the first pixel grayscale, the second pixel grayscale and the transition pixels, wherein the third pixel grayscales are between the first pixel grayscale and the second pixel grayscale; and
    transmitting the third pixel grayscales to the display panel for display;

wherein when a macroscopic edge of the display image region is a curved line, determining the transition pixels in the grayscale transition region comprises:

when an included angle between a tangential line of the macroscopic edge of the display image region and a column direction of the pixel array is greater than a first default included angle and less than 90°, determining that each grayscale transition region adjacent to the display image region comprises a plurality of transition pixels disposed in one row and adjacent to the display image region in the peripheral region;

when the included angle between the tangential line of the macroscopic edge of the display image region and the column direction of the pixel array is greater than 0° and less than a second default included angle, determining that each grayscale transition region adjacent to the display image region comprises a plurality of transition pixels disposed in one column and adjacent to the display image region in the peripheral region; and when the included angle between the tangential line of the macroscopic edge of the display image region and the column direction of the pixel array is greater than or equal to the second default included angle and less than or equal to the first default included angle, determining that each grayscale transition region adjacent to the display image region comprises one transition pixel adjacent to the display image region in the peripheral region; or when a macroscopic edge of the display image region is a straight line, determining the transition pixels in the grayscale transition region comprises:

when an included angle between the macroscopic edge of the display image region and a column direction of the pixel array is greater than a first default included angle and less than 90°, determining that each grayscale transition region adjacent to the display image region comprises a plurality of transition pixels located in one row and adjacent to the display image region in the peripheral region;

when the included angle between the macroscopic edge of the display image region and the column direction of the pixel array is greater than 0° and less than a second default included angle, determining that each grayscale transition region adjacent to the display image region comprises a plurality of transition pixels located in one column and adjacent to the display image region in the peripheral region; and when the included angle between the macroscopic edge of the display image region and the column direction of the pixel array is greater than or equal to the second default included angle and less than or equal to the first default included angle, determining that each grayscale transition region adjacent to the display image region comprises one transition pixel adjacent to the display image region in the peripheral region.

2. The image processing method according to claim 1, wherein the peripheral region further comprises a background image region, the background image region comprises a plurality of background pixels arranged along the row direction and the column direction; and acquiring the second pixel grayscale comprises:
determining an adjacent background pixel adjacent to the grayscale transition region in the row direction or in the column direction in the background image region, wherein the second pixel grayscale is a grayscale of the adjacent background pixel.

3. The image processing method according to claim 1, wherein a shape of the display image region comprises a non-rectangular shape.

4. The image processing method according to claim 3, wherein the non-rectangular shape comprises a round shape.

5. The image processing method according to claim 1, wherein determining the adjacent display pixel adjacent to the grayscale transition region in the row direction or in the column direction in the display image region according to the position of the grayscale transition region comprises:

determining an extending direction of the grayscale transition region according to the position of the grayscale transition region; and determining the adjacent display pixel adjacent to the grayscale transition region in the display image region in the extending direction of the grayscale transition region.

6. The image processing method according to claim 5, wherein a quantity of adjacent display pixels is at least one.

7. The image processing method according to claim 1, wherein adjusting the third pixel grayscales of the transition pixels according to the position of the grayscale transition region, the first pixel grayscale of the adjacent display pixel, the second pixel grayscale, and the transition pixels, comprises:

when the first pixel grayscale of the adjacent display pixel is greater than the second pixel grayscale, in the extending direction of the grayscale transition region, adjusting the third pixel grayscales of the transition pixels in the grayscale transition region to be gradually decreased in a direction from the display image region to the peripheral region; or when the first pixel grayscale of the adjacent display pixel is less than the second pixel grayscale, in the extending direction of the grayscale transition region, adjusting the third pixel grayscales of the transition pixels in the grayscale transition region to be gradually increased in a direction from the display image region to the peripheral region.

8. The image processing method according to claim 7, wherein grayscale change step lengths of the third pixel grayscales of the transition pixels in the grayscale transition region are same.

9. A drive device of a display panel, comprising:
a memory configured to store non-transitory computer readable instructions; and
a processor configured to execute the non-transitory computer readable instructions, wherein when the non-transitory computer readable instructions are executed by the processor, one or more steps in the image processing method according to claim 1 is performed.

10. The image processing method according to claim 1, wherein when the macroscopic edge of the display image region is a curved line, both the first default included angle and the second default included angle are acute angles, the first default included angle $\theta 1$ is greater than or equal to 45° and less than 90°, and the second default included angle $\theta 2$ is less than or equal to 45° and greater than 0°;

when the macroscopic edge of the display image region is a straight line, both the first default included angle and the second default included angle are equal to 45°.

11. A drive device of a display panel, wherein the display panel comprises a display image region and a peripheral region, the peripheral region comprises grayscale transition regions, the grayscale transition regions are adjacent to the display image region, a pixel array arranged in an array is arranged on the display panel, the display image region comprises a plurality of display pixels arranged along a row direction and a column direction, and the pixel array comprises the plurality of display pixels; and the drive device comprises:
a data acquisition circuit configured to acquire a first pixel grayscale and a second pixel grayscale;
a memory configured to store a position of each grayscale transition region; and
a processor configured to:
determining an adjacent display pixel adjacent to the grayscale transition region in the row direction or in the column direction in the display image region according to the position of the grayscale transition region stored, wherein the first pixel grayscale is a grayscale of the adjacent display pixel;
determining transition pixels in the grayscale transition region; and
adjusting third pixel grayscales of the transition pixels according to the first pixel grayscale, the second pixel grayscale and the transition pixels, wherein the third pixel grayscales are between the first pixel grayscale and the second pixel grayscale; and
a data transmission circuit configured to transmit the third pixel grayscales to the display panel for display;
wherein when a macroscopic edge of the display image region is a curved line, a step of determining the transition pixels in the grayscale transition region, performed by the processor, comprises:
when an included angle between a tangential line of the macroscopic edge of the display image region and a column direction of the pixel array is greater than a first default included angle and less than 90°, determining that each grayscale transition region adjacent to the display image region comprises a plurality of transition pixels disposed in one row and adjacent to the display image region in the peripheral region;
when the included angle between the tangential line of the macroscopic edge of the display image region and the column direction of the pixel array is greater than 0° and less than a second default included angle, determining that each grayscale transition region adjacent to the display image region comprises a plurality of transition pixels disposed in one column and adjacent to the display image region in the peripheral region; and
when the included angle between the tangential line of the macroscopic edge of the display image region and the column direction of the pixel array is greater than or equal to the second default included angle and less than or equal to the first default included angle, determining that each grayscale transition region adjacent to the display image region comprises one transition pixel adjacent to the display image region in the peripheral region; or
when a macroscopic edge of the display image region is a straight line, a step of determining the transition pixels in the grayscale transition region, performed by the processor, comprises:
when an included angle between the macroscopic edge of the display image region and a column direction of the pixel array is greater than a first default included angle and less than 90°, determining that each grayscale transition region adjacent to the display image region comprises a plurality of transition pixels located in one row and adjacent to the display image region in the peripheral region;
when the included angle between the macroscopic edge of the display image region and the column direction of the pixel array is greater than 0° and less than a second default included angle, determining that each grayscale transition region adjacent to the display image region comprises a plurality of transition pixels located in one column and adjacent to the display image region in the peripheral region; and
when the included angle between the macroscopic edge of the display image region and the column direction of the pixel array is greater than or equal to the second default included angle and less than or equal to the first default included angle, determining that each grayscale transition region adjacent to the display image region comprises one transition pixel adjacent to the display image region in the peripheral region.

12. The drive device according to claim 11, wherein the peripheral region further comprises a background image region, the background image region comprises a plurality of background pixels arranged along the row direction and the column direction; and the processor is also configured to determine an adjacent background pixel adjacent to the grayscale transition region in the row direction or in the column direction in the background image region according to the position of the grayscale transition region, wherein the second pixel grayscale is a grayscale of the adjacent background pixel.

13. The drive device according to claim 11, wherein a shape of the display image region includes a non-rectangular shape.

14. The drive device according to claim 11, wherein when the first pixel grayscale of the adjacent display pixel is greater than the second pixel grayscale, the processor is configured to: in the extending direction of the grayscale transition region, adjust the third pixel grayscales of the transition pixels in the grayscale transition region to be gradually decreased in a direction from the display image region to the peripheral region; or when the first pixel grayscale of the adjacent display pixel is less than the second pixel grayscale, the processor is configured to: in the extending direction of the grayscale transition region, adjust the third pixel grayscales of the transition pixels in the grayscale transition region to be gradually increased in a direction from the display image region to the peripheral region.

15. The drive device according to claim 14, wherein grayscale change step lengths of the third pixel grayscales of the transition pixels in the grayscale transition region are same.

16. A display panel, comprising the drive device according to claim 11.

17. A wearable device, comprising the display panel according to claim 16.

18. The drive device according to claim 11, wherein when the macroscopic edge of the display image region is a curved line, both the first default included angle and the second default included angle are acute angles, the first default included angle θ1 is greater than or equal to 45° and less than 90°, and the second default included angle θ2 is less than or equal to 45° and greater than 0°;

when the macroscopic edge of the display image region is a straight line, both the first default included angle and the second default included angle are equal to 45°.

* * * * *